United States Patent
Filiau

(10) Patent No.: US 10,962,271 B2
(45) Date of Patent: Mar. 30, 2021

(54) VESSEL WITH SUSPENSION SYSTEM

(71) Applicant: Cool Gear International, LLC, Plymouth, MA (US)

(72) Inventor: Cameron Filiau, Lunenburg, MA (US)

(73) Assignee: COOL GEAR INTERNATIONAL, LLC, Plymouth, MA (US)

( * ) Notice: Subject to any disclaimer, the term of this patent is extended or adjusted under 35 U.S.C. 154(b) by 0 days.

(21) Appl. No.: 16/789,807

(22) Filed: Feb. 13, 2020

(65) Prior Publication Data

US 2020/0271365 A1 Aug. 27, 2020

Related U.S. Application Data

(60) Provisional application No. 62/811,013, filed on Feb. 27, 2019.

(51) Int. Cl.
| | |
|---|---|
| *F25D 3/08* | (2006.01) |
| *A47J 45/06* | (2006.01) |
| *A45F 3/16* | (2006.01) |

(52) U.S. Cl.
CPC ............ *F25D 3/08* (2013.01); *A45C 2200/20* (2013.01); *A45F 3/16* (2013.01); *A47J 45/06* (2013.01); *F25D 2331/803* (2013.01)

(58) Field of Classification Search
CPC ...... A47J 45/06; F25D 3/08; F25D 2331/803; A45C 2200/20; A45C 13/28; A45C 11/20; A45F 3/16
See application file for complete search history.

(56) References Cited

U.S. PATENT DOCUMENTS

| | | | | |
|---|---|---|---|---|
| 45,873 | A * | 1/1865 | Steele | G01G 19/56 177/149 |
| 179,842 | A * | 7/1876 | Deland | G01G 19/58 177/131 |
| 1,105,618 | A * | 8/1914 | Christianson | G01G 19/56 177/149 |
| 1,221,673 | A * | 4/1917 | Canty | G01G 19/56 177/149 |
| 1,497,380 | A * | 6/1924 | Prawalski | A01J 9/00 177/149 |

(Continued)

OTHER PUBLICATIONS

Young, Lee, International Search Report and Written Opinion issued in application No. PCT/US2020/018057, dated May 13, 2020, 13 pages.

*Primary Examiner* — Stanton L Krycinski
(74) *Attorney, Agent, or Firm* — King & Spalding LLP

(57) ABSTRACT

A vessel with a suspension system for a handle assembly are described. For example, an apparatus can include: a hollow vessel having a body which includes one or more walls extending upwardly from a base portion to form an opening in fluid communication with an interior space of the body; a handle assembly movably coupled to the body, the handle assembly configured to slide outwardly or inwardly with respect to the vessel; and a flexible suspension member coupled to the body and to the handle assembly, the suspension member configured to at least partially suspend a weight of the vessel. The suspension member can stretch in response to outward motion of the handle assembly with respect to the vessel and compress in response to inward motion of the handle assembly with respect to the vessel.

19 Claims, 7 Drawing Sheets

(56) References Cited

U.S. PATENT DOCUMENTS

| | | | | |
|---|---|---|---|---|
| 2,710,083 A | * | 6/1955 | White | G01G 3/04 |
| | | | | 190/102 |
| 2,759,577 A | * | 8/1956 | White | G01G 19/58 |
| | | | | 190/102 |
| 4,537,044 A | * | 8/1985 | Putnam | A45C 11/20 |
| | | | | 220/902 |
| 5,295,365 A | * | 3/1994 | Redford | F25D 3/08 |
| | | | | 62/265 |
| 5,806,817 A | * | 9/1998 | Loud | E06C 7/14 |
| | | | | 248/210 |
| 6,364,329 B1 | | 4/2002 | Holub et al. | |
| 8,015,669 B2 | * | 9/2011 | Huang | A45F 5/10 |
| | | | | 16/405 |
| 8,256,242 B1 | | 9/2012 | Evans | |
| 8,485,329 B1 | * | 7/2013 | Roy | G01G 19/58 |
| | | | | 190/116 |
| 8,575,500 B1 | * | 11/2013 | Genet, Sr. | A45C 13/28 |
| | | | | 177/148 |
| 8,746,498 B2 | | 6/2014 | Maldonado et al. | |
| 8,800,795 B2 | | 8/2014 | Hwang | |
| 2003/0014837 A1 | * | 1/2003 | Tsai | A45C 5/02 |
| | | | | 16/113.1 |
| 2005/0224547 A1 | * | 10/2005 | Krulik | A45C 13/30 |
| | | | | 224/578 |
| 2013/0097810 A1 | * | 4/2013 | Ackerman | A45F 5/10 |
| | | | | 16/430 |

\* cited by examiner

US 10,962,271 B2

VESSEL WITH SUSPENSION SYSTEM

RELATED APPLICATIONS

The present application is a non-provisional application of and claims priority under 35 U.S.C. § 119 to U.S. Provisional Application No. 62/811,013, entitled "Vessel With Suspension System" and filed on Feb. 27, 2019, the entirety of which is incorporated by reference herein.

TECHNICAL FIELD

The present disclosure relates generally to vessels, and more particularly, to a vessel with a suspension system.

BACKGROUND

Many vessels designed for food or beverage storage, such as coolers, ice chests, jugs, bottles, and other similar containers, are equipped with handles to enable users to readily transport the vessel to a desired location. For instance, various conventional vessels with handle assemblies are illustrated in FIG. 1. Smaller vessels, such as jug 100, can have a single handle assembly 130 attached to the vessel body with a grip portion traversing the top of the vessel. Larger vessels, such as dispenser 110 or cooler 120, can have two physically separate handle assemblies 130 attached to opposite sides of the vessel body. Each handle assembly 130 can include one or more arms connected in various manners to the vessel body and extending outwardly therefrom. The grip portion can be disposed at the distal end of the one or more arms, and a user may grasp the grip portion in order to pick up and carry the vessel.

Upon loading the aforementioned vessels with food, beverages, ice, and the like, the vessels can become heavy. Consequently, carrying a loaded vessel by its handle(s) for a prolonged period of time can result in significant strain in the user's arms, neck, and back.

SUMMARY

The present disclosure provides a suspension system to support a vessel. The vessel can be equipped with a handle assembly to allow for transportation of the vessel. The vessel can further include a flexible suspension member coupled to the vessel and the handle assembly. By stretching and compressing in response to motion of the handle assembly during transportation, the suspension member can minimize vertical travel of heavy vessels typically induced by walking or running movements, resulting in less physical strain on the user.

In accordance with embodiments of the present disclosure, an apparatus can include: a hollow vessel having a body which includes one or more walls extending upwardly from a base portion to form an opening in fluid communication with an interior space of the body; a handle assembly movably coupled to the body, the handle assembly configured to slide outwardly or inwardly with respect to the vessel; and a flexible suspension member coupled to the body and to the handle assembly, the suspension member configured to at least partially suspend a weight of the vessel. The suspension member can stretch in response to outward motion of the handle assembly with respect to the vessel and compress in response to inward motion of the handle assembly with respect to the vessel.

The suspension member can be configured to suspend the weight of the vessel when an upward force with respect to the vessel is exerted on the handle assembly.

The suspension member can be configured to alternately stretch and compress in response to an upward force exerted on the handle assembly such that the handle assembly vertically oscillates independent of the vessel.

The suspension member can be coupled indirectly to the body via the handle assembly.

The suspension member can be disposed so as to not come into contact with the body.

The handle assembly can include a lower handle portion mounted to the body and an upper handle portion slidably coupled to the lower handle portion.

The upper handle portion can be configured to slide outwardly or inwardly with respect to the lower handle portion.

The suspension member can be configured to restrict a distance which the upper handle portion slides outwardly with respect to the lower handle portion.

The suspension member can be disposed so as to prevent uncoupling of the upper handle portion and the lower handle portion.

The lower handle portion and the upper handle portion can be structurally independent of each other.

The upper handle portion can include a lower handle receiving portion within which the lower handle portion is disposed.

The upper handle portion can be coupled indirectly to the body via the lower handle portion, such that the upper handle portion and the body do not contact each other.

The suspension member can be coupled indirectly to the body via the lower handle portion, such that the suspension member and the body do not contact each other.

The lower handle portion can be rotatably mounted to the body via a lower handle mounting member, a portion of the lower handle mounting member being cylindrically shaped.

The handle assembly can be formed with a hollow core section, and the suspension member is configured to pass through an interior of the core section.

The handle assembly can be formed with a suspension member attachment portion disposed at or proximate to a location at which the handle assembly is mounted to the body, and the suspension member can be attached to the handle assembly via the suspension member attachment portion.

The suspension member attachment portion can include a hook-shaped portion having a downwardly extending flange with respect to the vessel, and the suspension member is attached to the handle assembly via the hook-shaped portion.

The apparatus can further include: an additional handle assembly movably coupled to the body, the additional handle assembly disposed on an opposite side of the body as the handle assembly; and an additional flexible suspension member coupled to the body and to the additional handle assembly, the additional suspension member configured to suspend a portion of the additional handle assembly such that the additional suspension member stretches in response to outward motion of the additional handle assembly with respect to the vessel and compresses in response to inward motion of the additional handle assembly with respect to the vessel.

The suspension member can be at least partially composed of elastic.

The suspension member can include a plurality of elastic strands.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
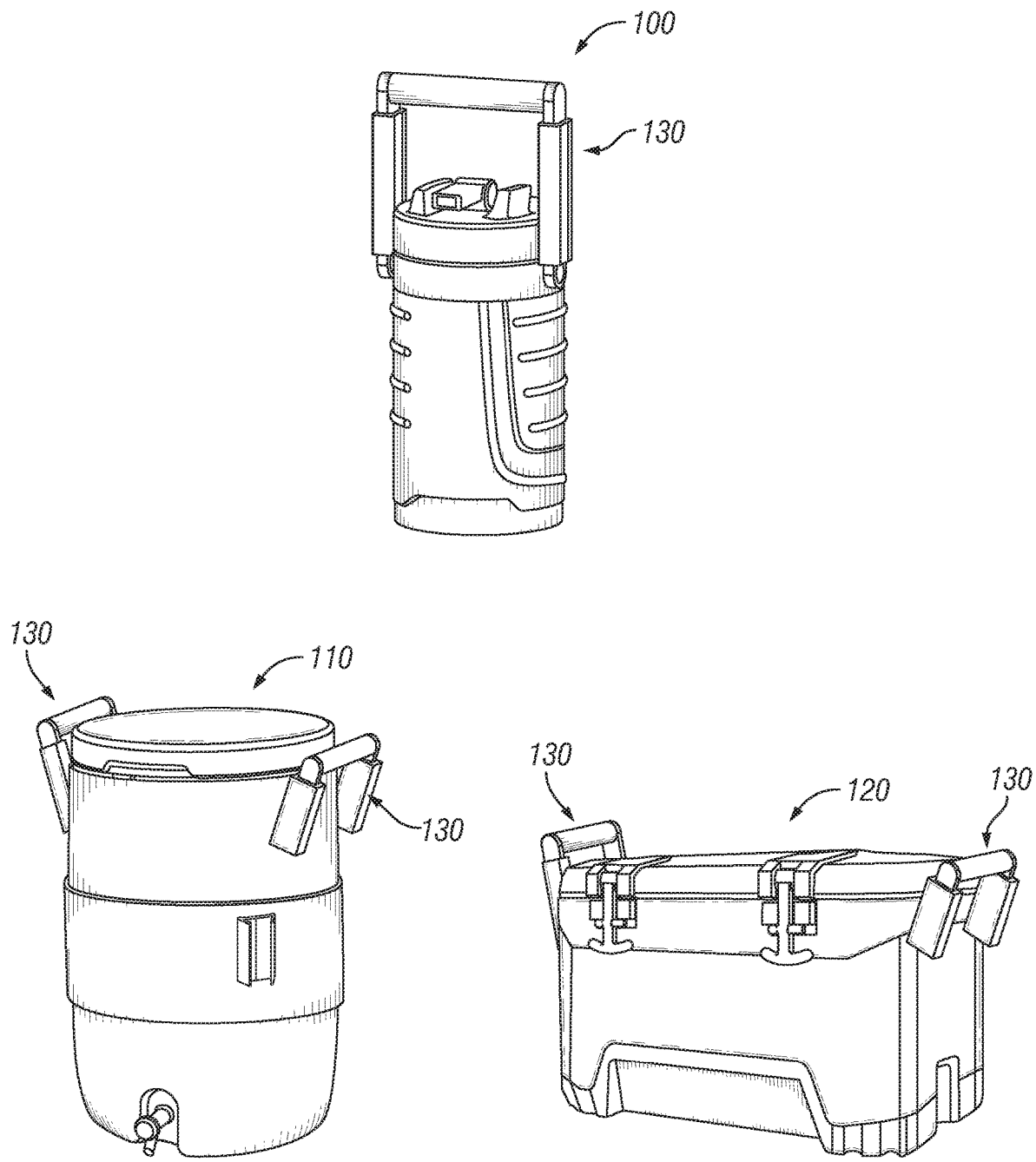
FIG. 1 is a view illustrating various conventional vessels with a handle assembly.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to embodiments of the present disclosure, the suspension system discussed herein can include a flexible suspension member capable of providing support for a handle assembly of a vessel. The suspension member can couple at least a portion of the handle assembly to the vessel. The suspension member can be formed with various flexible materials, such as elastic or a similar material capable of being stretched and compressed. Due to the physical properties of the suspension member, the handle assembly can oscillate vertically independent of the vessel, while vertical travel of the vessel itself is minimized, as the user grips the handle of the handle assembly to carry the vessel. Physical strain on the user's body can therefore be reduced by minimizing downward forces caused by the weight of the vessel.

Figure 2:
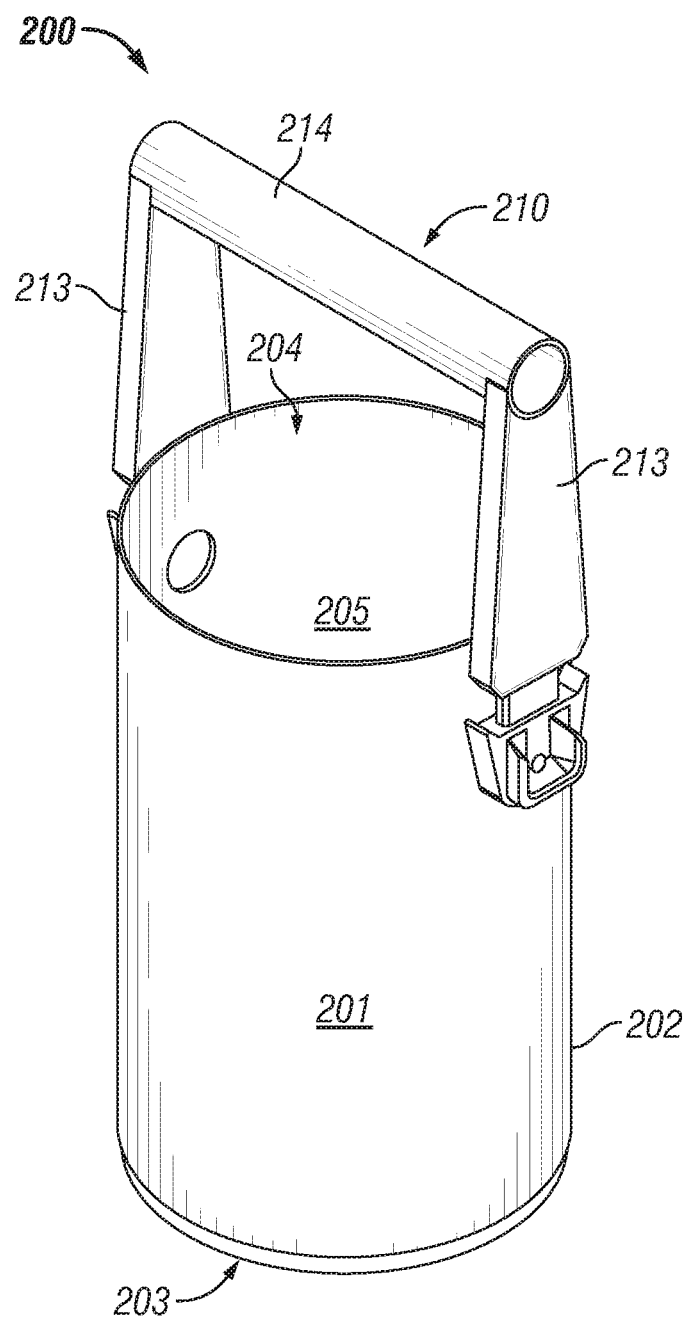
FIG. 2 is a view of a vessel including a handle assembly with upper and lower handle portions.

FIG. 2 is a view of a vessel 200 including a handle assembly 210. As shown in FIG. 2, the vessel 200 can be a container designed for food or beverage storage, such as a cooler, ice chest, jug, or bottle, or any other container consistent with the claims included herein. The vessel 200 can be hollow so as to allow for storage of contents such as food, beverages, ice, etc. The vessel 200 can include a body 201 with one or more walls 202 extending upwardly from a base portion 203 to form an opening 204 in fluid communication with an interior space 205 of the body 201. In some embodiments, the vessel 200 can include a lid (not shown) to seal the opening 204, as would be generally known in the art.

The vessel 200 can be made of various materials, and is not limited to any particular material or combination of materials. In one example, the body 201, one or more walls 202, and base portion 203, or any portion thereof, can be formed of any suitable material, such as plastic or combinations of plastic including, but not limited to, polypropylene (PP), polyethylene terephthalate (PET), high-density polyethylene, low-density polyethylene, vinyl, polystyrene, or the like. The vessel 200 can be constructed using various techniques known in the art including, but not limited to, injection molding, rotational molding, blow molding, and the like.

The vessel 200 can be equipped with a handle assembly 210 to enable a user to carry the vessel 200 to a desired location. The handle assembly 210 can be movably coupled to the body 201. In some embodiments, the handle assembly 210 can be rotatably coupled to the body 201, allowing the handle assembly 210 to rotate about an axis, as described in greater detail below with respect to FIG. 3. For example, the handle assembly 210 can rotate between an engaged position, in which the handle assembly 210 is positioned to extend directly upward (e.g., see FIG. 2), convenient for carrying the vessel 200, and a stowed position, in which the handle assembly 210 is positioned against the body 201.

In some embodiments, the vessel 200 can include a single handle assembly 210, as shown in FIG. 2. In such case, the arms 213 of the handle assembly 210 can connect to the vessel 200 at opposite sides of the body 201. A grip or handle section (also referred to herein as a "core section") 214, onto which a user can grab for carrying the vessel 200, can be disposed between the arms 213 of the handle assembly 210 and traverse the top of the vessel 200. Also, a suspension member 220 (FIG. 6A) can be coupled to the single handle assembly 210, as described in further detail below.

In other embodiments, the vessel 200 can include two handle assemblies 210 disposed at opposite sides of the body 201. In such case, the dual handle assemblies 210 can be designed to operate in the same manner as the single handle assembly 210. Moreover, each of the dual handle assemblies 210 can be coupled to a suspension member 220 (FIG. 6A), resulting in dual suspension members 220 (FIG. 6A) disposed at opposite sides of the body 201. Operation of the suspension member 220 (FIG. 6A) will be described in further detail below. It is to be understood that larger vessels 200 can include two (or more) handle assemblies 210, while smaller vessels 200 can include only a single handle assembly 210, in order to maximize user convenience.

The handle assembly 210 can be further configured to slide inwardly or outwardly with respect to the vessel 200. In this regard, the handle assembly 210 can include a lower handle portion 211 (FIG. 3) mounted to the body 201 and an upper handle portion 212 (FIG. 3) slidably coupled to the lower handle portion 211 (FIG. 3).

Figure 3:
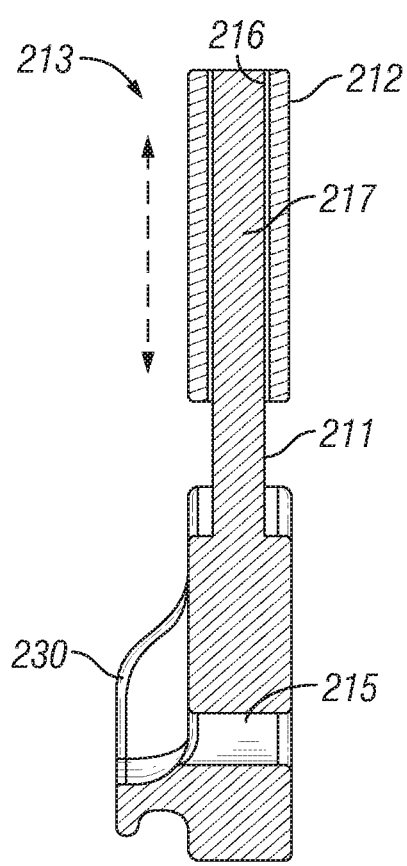
FIG. 3 is an isolated cross-sectional side view of the lower and upper handle portions of FIG. 2.

In detail, FIG. 3 is an isolated cross-sectional side view, corresponding to the portion of the handle assembly 210 within the dashed circle in FIG. 2, of the lower and upper handle portions 211 and 212 of the handle assembly 210. As shown in FIG. 3, the arms 213 of the handle assembly 210 can include the lower handle portion 211 and the upper handle portion 212. The lower handle portion 211 and the upper handle portion 212 can be components structurally independent of each other. The lower handle portion 211 can be affixed directly to the body 201 of the vessel 200, while the upper handle portion 212 can be coupled indirectly to the body 201 of the vessel 200 via the lower handle portion 211. That is, the lower handle portion 211 can come into contact with the body 201, while the upper handle portion 212 and the body 201 do not contact each other.

In some embodiments, the lower handle portion 211 can be rotatably mounted to the body 201, allowing the handle assembly 210 to rotate about an axis A. For example, the lower handle portion 211 can rotate about axis A, thereby enabling rotation of the handle assembly 210, between, at least, the engaged position and the stowed position described above. The lower handle portion 211 can be rotatably mounted to the body 201 via a lower handle mounting member 215 configured to allow rotation of the lower handle portion 211. To this end, a portion of the lower handle mounting member 215 can be cylindrically shaped. For example, the lower handle mounting member 215 can include, but is not limited to, a screw, a bolt, a pin, a snap, or the like. The lower handle mounting member 215 can be structurally integral with the body 201 (i.e., formed with the same material as an extension of the body 201), or structurally independent of the body 201. The lower handle mounting member 215 can be inserted into a correspondingly sized opening formed in the lower handle portion 211, such that the lower handle portion 211 can pivot about the lower handle mounting member 215.

Meanwhile, the upper handle portion 212 can be configured to slide outwardly or inwardly with respect to the lower handle portion 211. In detail, the upper handle portion 212 can be formed with a lower handle receiving portion 216 within which the lower handle portion 211 is disposed. The lower handle portion 211 can be formed with a lower handle extension portion 217 disposed inside of the lower handle receiving portion 216 of the upper handle portion 212. The upper handle portion 212 can thus slide over the lower handle extension portion 217 of the lower handle portion 211 in an outward (i.e., away from the lower handle portion 211) or an inward (i.e., toward the lower handle portion 211) direction.

The inward sliding motion of the upper handle portion 212 can terminate when a portion of the upper handle portion 212 abuts a portion of the lower handle portion 211. The lower and upper handle portions 211 and 212 can be formed with one or more features acting as stops to limit the inward sliding motion of the upper handle portion 212. Conversely, the lower and upper handle portions 211 and 212 can be formed such that the outward sliding motion of the upper handle portion 212 is not limited by the lower handle portion 211. Instead, the suspension member 220 (FIG. 6A) can be disposed so as to limit the outward sliding motion of the upper handle portion 212 by restricting the distance which the upper handle portion 212 slides outwardly, as described in greater detail below. That is, the suspension member 220 (FIG. 6A) can prevent the lower handle portion 211 and the upper handle portion 212 from decoupling.

Figure 4A:
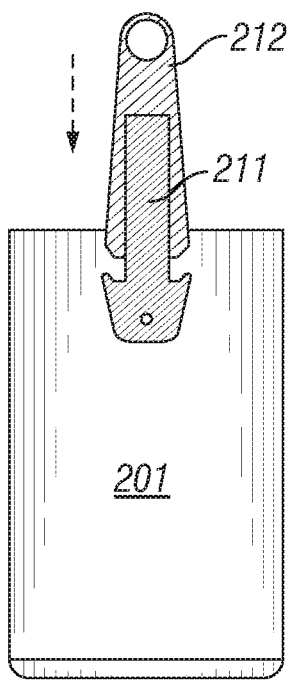
FIGS. 4A and 4B include cross-sectional side and front views, respectively, of the vessel of FIG. 2 with the handle assembly in a resting state.
Figure 4B:
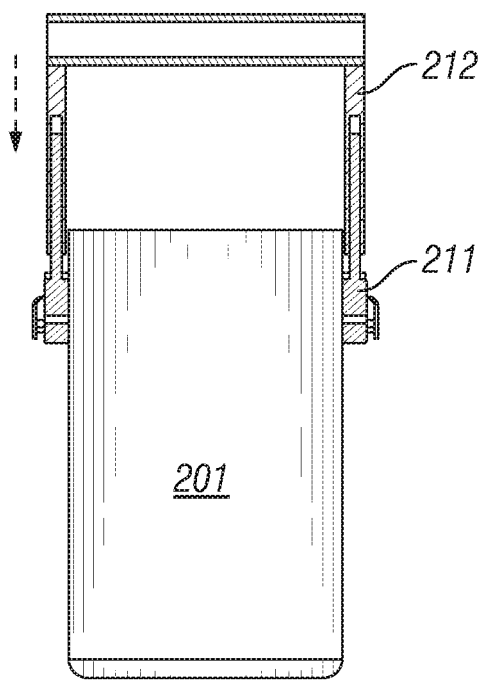
Figure 5A:
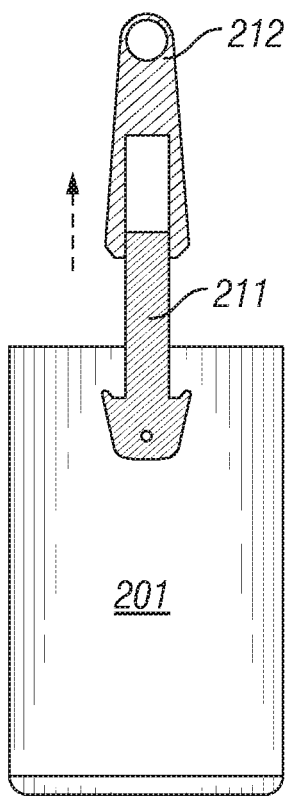
FIGS. 5A and 5B include cross-sectional side and front views, respectively, of the vessel of FIG. 2 with the handle assembly in an activated state.
Figure 5B:
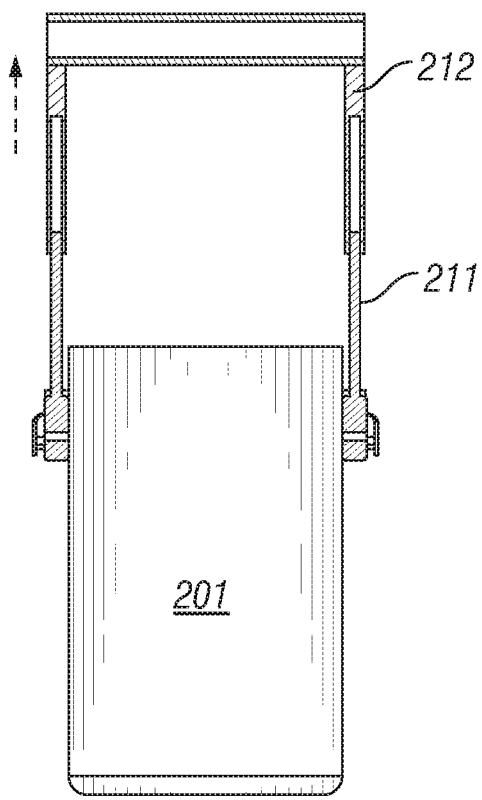

FIGS. 4A and 4B include cross-sectional side and front views, respectively, of the vessel 200 with the handle assembly 210 in a resting state, and FIGS. 5A and 5B include cross-sectional side and front views, respectively, of the vessel 200 with the handle assembly 210 in an activated state. As shown in FIGS. 4A and 4B, the upper handle portion 212 can slide inwardly (toward the lower handle portion 211) such that the lower handle extension portion 217 (FIG. 3) of the lower handle portion 211 fully extends into the lower handle receiving portion 216 (FIG. 3) of the upper handle portion 212. Here, the handle assembly 210 (FIG. 2) can be in a resting state, such as when the vessel 200 resting on a surface, and no upward force ("carrying force") is exerted on the handle assembly 210 (FIG. 2).

As shown in FIGS. 5A and 5B, the upper handle portion 212 can slide outwardly (away from the lower handle portion 211) such that the lower handle extension portion 217 (FIG. 3) of the lower handle portion 211 only partially extends into the lower handle receiving portion 216 (FIG. 3) of the upper handle portion 212. Here, the handle assembly 210 (FIG. 2) can be in an activated state, such as when the vessel 200 is being carried by an upward force ("carrying force") exerted on the handle assembly 210 (FIG. 2). In this case, the weight of the vessel 200, in addition to its contents, can activate the handle assembly 210 (FIG. 2), that is, cause the upper handle portion 212 to slide outwardly with respect to the lower handle portion 211.

In order to prevent the upper handle portion 212 from separating or decoupling from the lower handle portion 211 when the upper handle portion 212 slides away from the lower handle portion 211, as well as to support a weight of the vessel 200 and its contents when an upward force ("carrying force") is exerted on the handle assembly 210 (FIG. 2), a flexible suspension member 220 (FIG. 6A) can be coupled to the body 201 (FIG. 2) of the vessel 200 and to the handle assembly 210 (FIG. 2). In this regard, FIGS. 6A-6C include perspective, side, and cross-sectional front views, respectively, of the vessel 200 with the handle assembly 210 and a suspension member 220. The suspension member 220 can be made of a flexible material allowing the suspension member 220 to stretch and compress in response to forces or stresses acted thereupon. The suspension member 220 can be formed of various materials having flexible properties. For example, the suspension member 220 can be, at least partially, composed of an elastomer (i.e., elastic) or other similarly flexible polymers. In some embodiments, the suspension member 220 can comprise a plurality of elastic strands bound together to form a cord-like structure capable of stretching and compressing. Other characteristics of the suspension member 220, such as length, strength or elasticity, and so forth, can vary based on preferences of the designer. Such characteristics can be selected or optimized based on factors such as a maximum fill capacity of the vessel 200, a weight of the vessel 200, dimensions of the handle assembly 210, and the like.

Figure 6A:
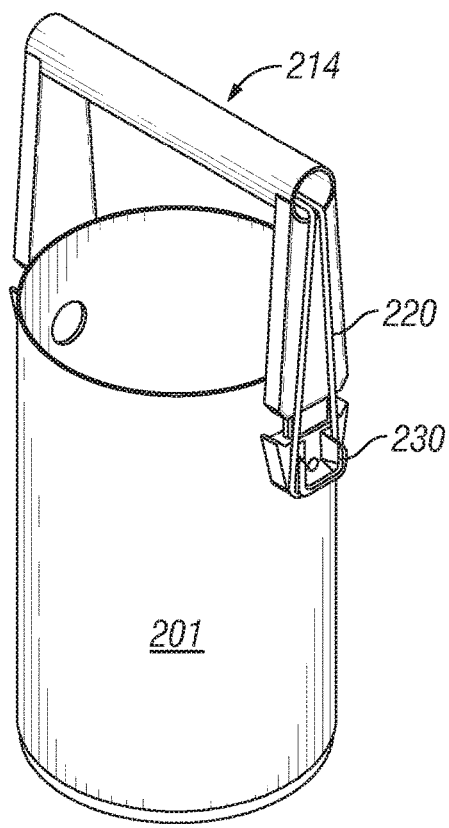
FIGS. 6A-6C include perspective, side, and cross-sectional front views, respectively, of the vessel of FIG. 2 with the handle assembly and a suspension member.
Figure 6B:
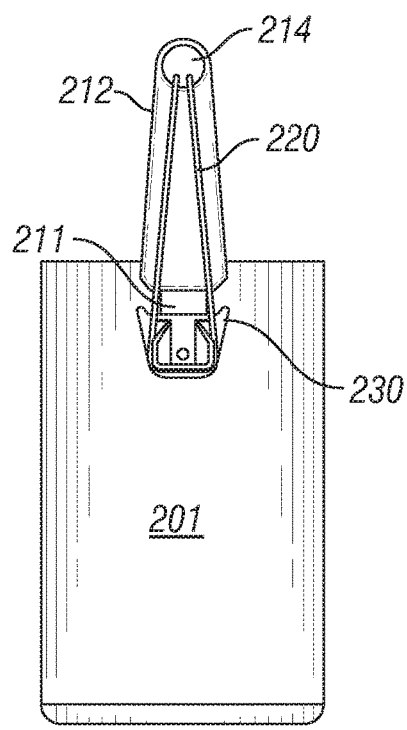
Figure 6C:
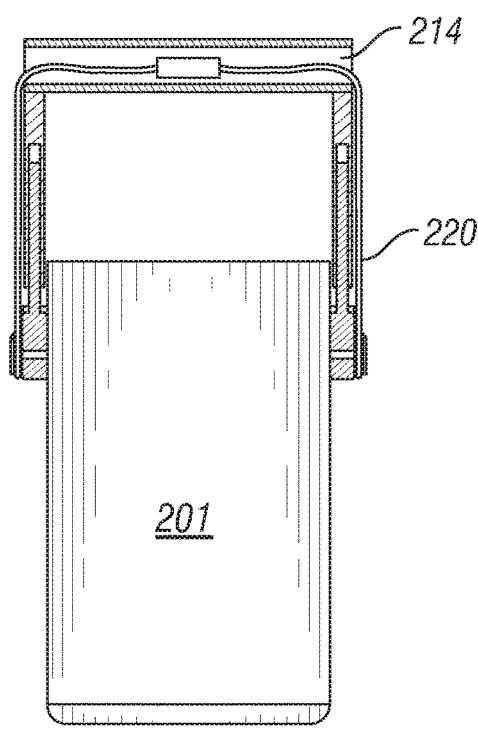

As shown in FIGS. 6A-6C, the suspension member 220 can be coupled to the body 201 of the vessel 200 via the handle assembly 210. In some embodiments, the suspension member 220 can be indirectly coupled to the body 201 via the handle assembly, or more specifically, the lower handle portion 211 of the handle assembly 210. That is, the suspension member 220 can be disposed so as to contact portions of the handle assembly 210 without also contacting the body 201.

The suspension member 220 can couple to the lower handle portion 211 and the upper handle portion 212 in various ways, while allowing the aforementioned outward and inward motion of the upper handle portion 212 within the range of stretch of the suspension member 220. Firstly, referring again to FIG. 3, the suspension member attachment portion 230 can be disposed at or proximate to a location at which the handle assembly 210 is mounted to the body 201 of the vessel 200. More specifically, the suspension member attachment portion 230 can be disposed against an outer surface of the lower handle portion 211. The suspension member attachment portion 230 can operate such that the suspension member 220 attaches to the handle assembly 210 through the suspension member attachment portion 230.

The suspension member attachment portion 230 can be formed in various ways suitable for receiving and retaining the suspension member 220 to the lower handle portion 211. In some embodiments, the suspension member attachment portion 230 can include a hook-shaped portion having a downwardly extending flange with respect to the vessel 200. The suspension member 220 can be attached to the handle assembly 210 via the hook-shaped portion. In some cases, the suspension member attachment portion 230 can be structurally integral with the lower handle portion 211 (i.e., formed with the same material as an extension of the lower handle portion 211). In other cases, the suspension member attachment portion 230 can be structurally independent of the lower handle portion 211 and connect or attach to the outer surface of the lower handle portion 211.

The suspension member attachment portion 230 can include alternative features suitable for attaching to the suspension member 220. As an example, the suspension member attachment portion 230 can be formed with a passage through which the suspension member 220 passes. Along these lines, the suspension member attachment portion 230 can be formed with features to trap the suspension member 220, and/or the suspension member 220 can be molded into the suspension member attachment portion 230. As another example, the suspension member attachment portion 230 can include hardware, such as a snap, a button, a clip, or the like, capable of affixing to the suspension member 220.

It is understood that the suspension member attachment portion 230 can be formed on both sides of the vessel 200. In this regard, the handle assembly 210 can include two lower handle portions 211 respectively disposed at opposite sides of the vessel 200. The suspension member attachment portion 230 can be disposed at each of the lower handle portions 211.

Secondly, the suspension member 220 can extend from its attachment location at the lower handle portion 211 to the upper handle portion 212, where the suspension member 220 can couple to the upper handle portion 212 in various ways. In some embodiments, the upper handle portion 212 can be formed with a hollow core section 214, as shown in FIGS. 6A-6C. The hollow core section 214 can correspond to a handle or grip portion onto which a user can grab for carrying the vessel 200.

In such case, the suspension member 220 can extend upwardly from the suspension member attachment portion 230 on one side of the vessel 200 to the core section 214 of the upper handle portion 212, traverse the interior of the core section 214, and extend downwardly toward the suspension member attachment portion 230 disposed on the other side of the vessel 200. As a result, the suspension member 220 can allow the upper handle portion 212 to slide outwardly (away from the lower handle portion 211), but prevent decoupling of the upper handle portion 212 and the lower handle portion 211 by restricting the distance the upper handle portion 212 can slide outwardly.

The upper handle portion 212 can be formed with alternative features suitable for attaching to the suspension member 220, such that the suspension member 220 prevents decoupling of the upper handle portion 212 and the lower handle portion 211. As an example, the upper surface of the upper handle portion 212 can be formed with a recess configured to receive a portion of the suspension member 220 traversing the upper handle portion 212. As another example, instead of traversing the upper handle portion 212, dual suspension members 220 can attach directly to opposite ends of the upper handle portion 212. Such suspension members 220 can attach to the lower handle portion 211 in a manner described above, extend upwardly therefrom, and attach to opposite ends of the upper handle portion 212, respectively.

As further shown in FIGS. 6A-6C, the suspension member 220 and lower and upper handle portions 211 and 212 can be arranged such that the suspension member 220 forms a loop around the suspension member attachment portion 230, from which two strands of the suspension member 220 extend upwardly to the upper handle portion 211. Furthermore, the two strands of the suspension member 220 can extend toward the upper handle portion 212, enter the interior of the core section 214 at one end thereof (assuming the upper handle portion 212 includes the core section 214), and extend from the opposite end of the core section 214 to the suspension member attachment portion 230 disposed at the opposite side of the vessel 200. However, the present embodiments are not limited as such. In other embodiments (not shown), a single strand of the suspension member 220 can attach to the suspension member attachment portion 230 and couple the lower handle portion 211 to the upper handle portion 212. Generally, the suspension member 220 can be arranged in any manner suitable for coupling the lower handle portion 211 and the upper handle portion 212 together.

Figure 7A:
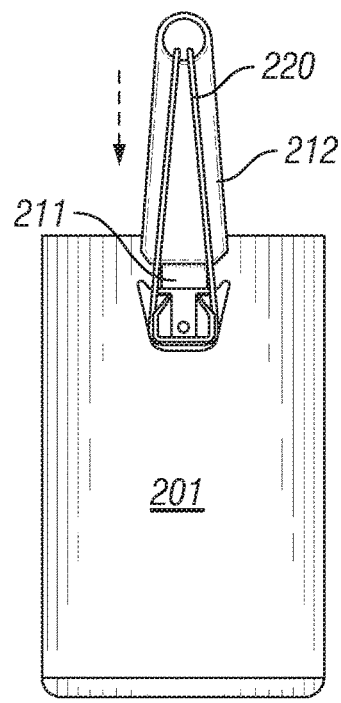
FIGS. 7A and 7B include side and front views, respectively, of the vessel of FIG. 2 with the suspension member of FIGS. 6A-6C in a compressed state.
Figure 7B:
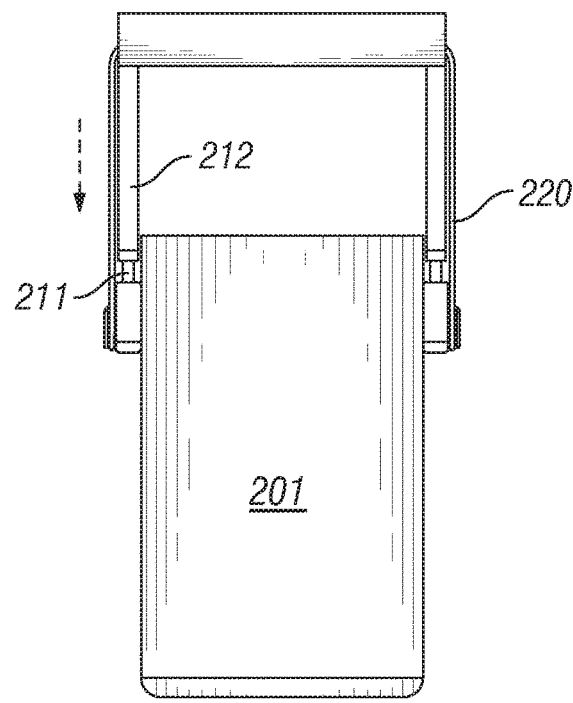

Operationally, the suspension member 220 can suspend a portion of the handle assembly 210, such that the suspension member 220 stretches in response to outward motion of the handle assembly 210 with respect to the vessel 200 and compresses in response to inward motion of the handle assembly 210 with respect to the vessel 200. To illustrate, FIGS. 7A and 7B include side and front views, respectively, of the vessel 200 with the suspension member 220 in a compressed state, and FIGS. 8A and 8B include side and front views of the vessel 200 with the suspension member 220 in a stretched state. As shown in FIGS. 7A and 7B, when the lower handle extension portion 217 of the lower handle portion 211 fully extends into the lower handle receiving portion 216 of the upper handle portion 212, the suspension member 220 can be in a compressed state. The suspension member 220 can be compressed if, for example, the vessel 200 is resting on a surface, such that there is minimal weight for the suspension member 220 to support.

Figure 8A:
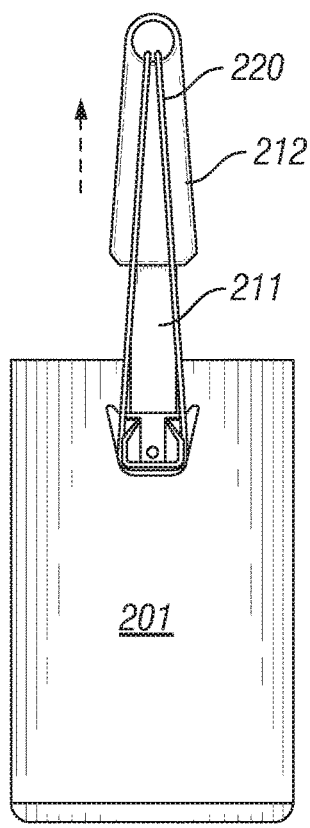
FIGS. 8A and 8B include side and front views, respectively, of the vessel of FIG. 2 with the suspension member of FIGS. 6A-6C in a stretched state.
Figure 8B:
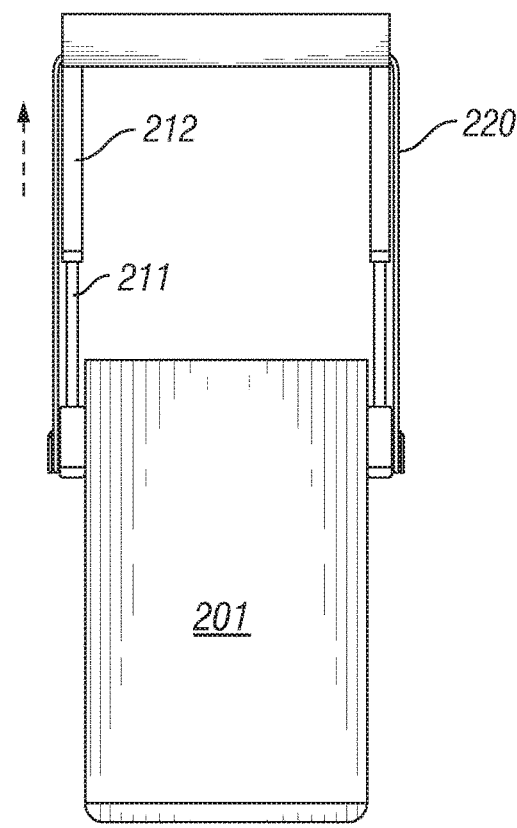

Conversely, as shown in FIGS. 8A and 8B, when a user carries the vessel 200, thereby exerting an upward force ("carrying force") on the handle assembly 210, the upper handle portion 212 can slide upwardly and begin to separate from the lower handle portion 211, causing the suspension member 220 to stretch. While the amount of stretch by the suspension member 220 can vary depending upon a weight of the vessel 200 (and its contents), the flexibility of the suspension member 220 can be limited such that decoupling of the lower and upper handle portions 211 and 212 is prevented.

Figure 9:
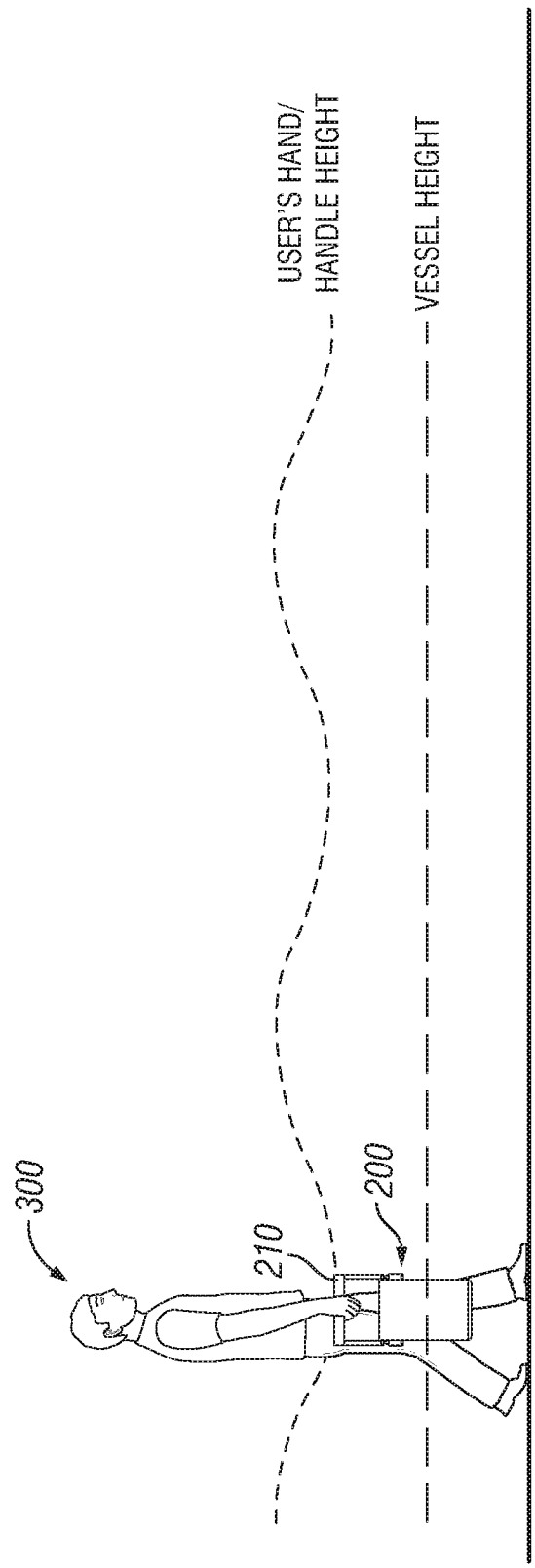
FIG. 9 is a simplified view of a user carrying the vessel of FIG. 2.

To illustrate, FIG. 9 is a simplified view of a user 300 carrying the vessel 200. As the user 300 carries the vessel 200 by gripping the handle assembly 210, the suspension member 220 can be configured to stretch from its compressed state shown in FIGS. 7A and 7B. Here, the suspension member 220 can at least partially support the weight of the vessel 200, thereby lightening the load of carrying the vessel 200 on the user 300. Moreover, as the user 300 walks with the vessel 200, the handle assembly 210 height can oscillate vertically, that is, travel up and down, due to natural movements of the user 300 while walking. Conventionally, the vessel 200 also follows the movement of the handle assembly 210 and the user's hand, causing the vessel 200 to travel up and down, resulting in strain on the user's upper body.

In the present case, however, as the upper handle portion 212 repeatedly slides inwardly and outwardly with respect to the lower handle portion 211 in response to forces exerted on the handle assembly 210 resulting from the user 300 carrying the vessel 200, the elasticity of the suspension member 220 can permit the suspension member 220 to alternately stretch and compress, allowing the handle assembly 210 to vertically oscillate independent of the vessel 200. Consequently, the handle assembly 210 height can change (i.e., travel up and down), while the height of the vessel 200 can remain substantially the same, as shown in FIG. 9. Because the weight of the vessel 200 (and its contents) can be largely supported by the suspension member 220, and the suspension member 220 can absorb the repeated upward and downward forces exerted on the handle assembly 210 caused by natural movements of the user 300 while walking, strain on the user's upper body resulting from carrying the vessel 200 for a prolonged period of time can be greatly reduced.

The foregoing description has been directed to certain embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus comprising:
   a hollow vessel having a body which includes one or more walls extending upwardly from a base portion to form an opening in fluid communication with an interior space of the body;
   a handle assembly movably coupled to the body, the handle assembly configured to slide outwardly or inwardly with respect to the vessel, the handle assembly comprising a first arm, a second arm, and a hollow core section configured to be disposed between the first and second arms and traverse the top of the vessel; and
   a flexible suspension member coupled to the body and to the handle assembly, the suspension member configured to at least partially suspend a weight of the vessel, wherein the suspension member is configured to stretch in response to outward motion of the handle assembly with respect to the vessel and compress in response to inward motion of the handle assembly with respect to the vessel, and
   wherein the suspension member is configured to pass through an interior of the hollow core section.

2. The apparatus of claim 1, wherein the suspension member is configured to suspend the weight of the vessel when an upward force with respect to the vessel is exerted on the handle assembly.

3. The apparatus of claim 1, wherein the suspension member is configured to alternately stretch and compress in response to an upward force exerted on the handle assembly such that the handle assembly vertically oscillates independent of the vessel.

4. The apparatus of claim 1, wherein the suspension member is coupled indirectly to the body via the handle assembly.

5. The apparatus of claim 1, wherein the suspension member is disposed so as to not come into contact with the body.

6. The apparatus of claim 1, wherein each of the first and second arms of the handle assembly includes a lower handle portion mounted to the body and an upper handle portion slidably coupled to the lower handle portion.

7. The apparatus of claim 6, wherein the upper handle portion is configured to slide outwardly or inwardly with respect to the lower handle portion.

8. The apparatus of claim 6, wherein the suspension member is configured to restrict a distance which the upper handle portion slides outwardly with respect to the lower handle portion.

9. The apparatus of claim 6, wherein the suspension member is disposed so as to prevent uncoupling of the upper handle portion and the lower handle portion.

10. The apparatus of claim 6, wherein the lower handle portion and the upper handle portion are structurally independent of each other.

11. The apparatus of claim 6, wherein the upper handle portion includes a lower handle receiving portion within which the lower handle portion is disposed.

12. The apparatus of claim 6, wherein the upper handle portion is coupled indirectly to the body via the lower handle portion, such that the upper handle portion and the body do not contact each other.

13. The apparatus of claim 6, wherein the suspension member is coupled indirectly to the body via the lower handle portion, such that the suspension member and the body do not contact each other.

14. The apparatus of claim 6, wherein the lower handle portion is rotatably mounted to the body via a lower handle mounting member, a portion of the lower handle mounting member being cylindrically shaped.

15. The apparatus of claim 1, wherein the handle assembly is formed with a suspension member attachment portion disposed at or proximate to a location at which the handle assembly is mounted to the body, and the suspension member is attached to the handle assembly via the suspension member attachment portion.

16. The apparatus of claim 15, wherein the suspension member attachment portion includes a hook-shaped portion having a downwardly extending flange with respect to the vessel, and the suspension member is attached to the handle assembly via the hook-shaped portion.

17. The apparatus of claim 1, further comprising:
   an additional handle assembly movably coupled to the body, the additional handle assembly disposed on an opposite side of the body as the handle assembly; and an additional flexible suspension member coupled to the body and to the additional handle assembly, the additional suspension member configured to suspend a portion of the additional handle assembly such that the additional suspension member stretches in response to outward motion of the additional handle assembly with respect to the vessel and compresses in response to inward motion of the additional handle assembly with respect to the vessel.

18. The apparatus of claim 1, wherein the suspension member is at least partially composed of an elastomer.

19. The apparatus of claim 1, wherein the suspension member comprises a plurality of elastic strands.

* * * * *